J. N. NEWSOM.
VALVE FOR PNEUMATIC TIRES.
APPLICATION FILED DEC. 9, 1912.
1,169,277.
Patented Jan. 25, 1916.
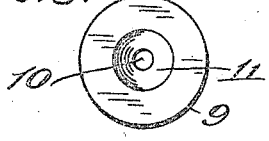
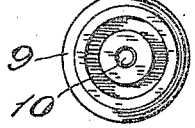
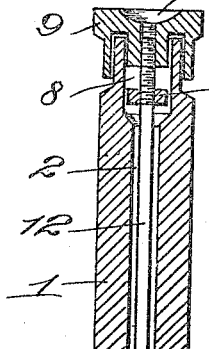
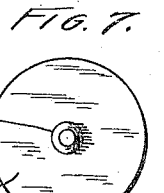
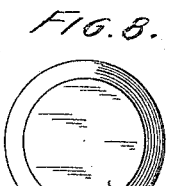
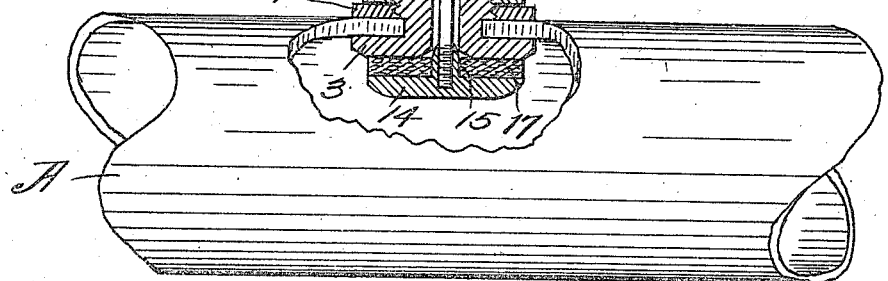
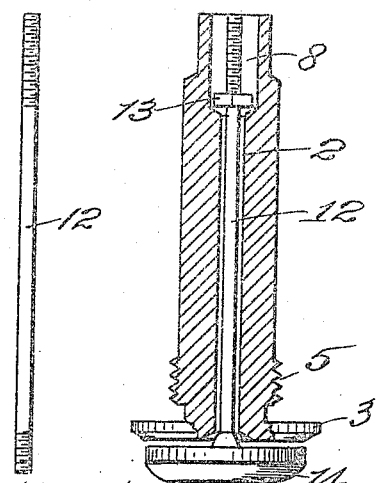
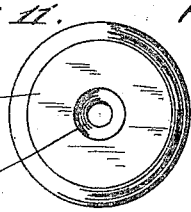
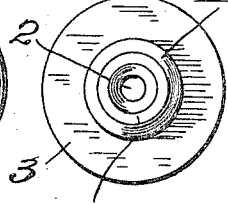
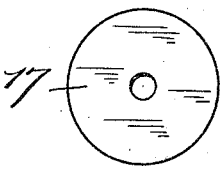
INVENTOR,
Joseph N. Newsom

UNITED STATES PATENT OFFICE.

JOSEPH N. NEWSOM, OF ST. LOUIS, MISSOURI, ASSIGNOR, BY MESNE ASSIGNMENTS, TO WILLIAM H. MORGENS, OF ST. LOUIS, MISSOURI.

VALVE FOR PNEUMATIC TIRES.

1,169,277.  Specification of Letters Patent.  Patented Jan. 25, 1916.

Application filed December 9, 1912. Serial No. 735,641.

*To all whom it may concern:*

Be it known that I, JOSEPH N. NEWSOM, a citizen of the United States, residing at St. Louis, State of Missouri, have invented a new and useful Valve for Pneumatic Tires, of which the following is a specification.

My invention relates to valves particularly intended for use on pneumatic or inflatable tires, the principal object of my invention being to construct a comparatively simple, inexpensive valve which is positive in action, and which may be readily removed from the rim of a wheel without injury to any of the parts of the valve.

A further object of my invention is to construct a perfectly air-tight valve without the use of springs and other delicate parts which are liable to become easily broken and unserviceable.

A puncture of a pneumatic tire necessitates the removal of the casing and the inner tube, and as a result, the stem must be removed from the rim, and under ordinary circumstances the valve housing is generally seated very tightly in the rim, and in removing said valve a hammer or like tool is often used, and as a result, the valve housing is battered down with injury to the threads thereon, and very often rendering some of the parts within the valve inoperative.

I propose to provide a valve devoid of springs and small parts, and to construct the valve housing and cap on the outer end thereof in a strong and substantial manner so that the housing will readily withstand blows of a hammer or like tool when it is removed from the wheel rim.

By virtue of my improved construction the valve proper is located at the lower end of the valve housing within the tube to which the valve is connected, and thus the disk of the valve proper and the valve seat are protected so that a tight joint is always maintained between the valve disk and seat.

To the above purposes my invention consists in certain novel features of construction and arrangement of parts hereinafter more fully described, claimed and shown in the accompanying drawings, in which:

Figure 1 is a sectional view taken through the center of a valve of my improved construction, the same being applied to an inflatable tube. Fig. 2 is a sectional view similar to Fig. 1, showing the valve cap removed and the packing disk removed from the valve seat. Fig. 3 is a side elevational view of the valve stem. Fig. 4 is a side elevational view of the screw cap that is normally positioned on the outer end of the valve housing. Fig. 5 is a plan view of the screw cap. Fig. 6 is a view of the underside of the screw cap. Fig. 7 is a plan view of the disk which carries the valve packing. Fig. 8 is a view of the underside of this disk. Fig. 9 is a side elevational view of the disk. Fig. 10 is a plan view of the valve housing with the screw cap removed. Fig. 11 is a view looking at the lower end of the valve housing with the valve removed. Fig. 12 is a plan view of the valve disk forming a part of the valve, and which disk engages directly against the valve seat on the underside of the valve housing.

Referring by numerals to the accompanying drawings, 1 designates the valve housing which is preferably of cylindrical form and provided with a centrally arranged port 2. Formed integral with the lower end of this housing is a disk 3, the underside of which is flat and forms the valve seat, and the end of the port 2 which passes through the disk 3 is countersunk, as designated by 4. The housing 1 is threaded, as designated by 5, immediately adjacent the disk 3 in order to receive a nut 6 used for attaching the valve to the inflatable tube A. When the valve is attached to the tube the disk 3 is located within said tube and a packing ring 7 is positioned on the outer surface of the tube around the opening therein, said packing ring being clamped in position by means of the nut 6. The port 2 is enlarged at the upper end of the valve housing, as designated by 8, to form an air chamber. A cap 9 is loosely seated on the upper end of the valve housing, and normally closes the port or passage-way therethrough. This cap is provided with a centrally arranged threaded aperture 10, and formed in the top surface of said nut around the aperture is a recess 11.

12 designates the valve stem in the form of a small rod, both ends of which are threaded, said stem being smaller in diameter than the port 2, and the threaded upper end of said stem receives a nut 13 which normally occupies a position in the air chamber 8 and prevents the stem dropping through the valve housing. Carried by the lower end of the stem is a valve comprising a metal disk 14 having a centrally arranged lug 15 which receives the threaded lower end of the stem 12, and the upper end of this lug is beveled, as designated by 16 in order that the valve may properly center itself upon the seat when the upper end of the lug enters the countersunk end 4 of the port 2. Positioned on top of the disk 14 is a gasket or packing disk 17, of rubber, leather or fiber, the top face of which packing disk is adapted to fit against the flat under-face of the disk 3.

When the tire is inflated and the valve is in use the cap 9 is seated on the upper end of the housing 1 with the threaded upper end of the stem 12 seated in the threaded aperture 10 in said cap, and thus when the cap is screwed upon the valve stem the valve comprising the parts 14 and 17 are drawn against the valve housing so as to maintain a perfectly tight joint between the gasket 17 and the valve seat on the underside of the disk 3. When the tire is to be inflated the cap 9 is removed, which permits the valve and stem to drop downward with respect to the valve housing until the nut 13 rests on the shoulder between the port 2 and air chamber 8, and the end of the tube from the pump or source of compressed air is now applied to the outer end of the valve housing, and when sufficient compressed air has been forced into the inflatable tube, the pressure of said air against the disk 14 will cause the same to move upward, thereby causing the gasket 17 to engage the valve seat, and thus the valve performs the function of a check valve to prevent the compressed air from escaping through the valve housing. When the desired amount of compressed air has been forced into the inflatable tube the cap 9 is seated on the upper end of the valve housing, thereby closing the port through the valve housing, and as the valve stem 12 is engaged, the same is drawn upward, and consequently the gasket is maintained tightly upon the valve seat.

The cap 9 is made sufficiently heavy to withstand blows of a hammer or like tool when the valve is removed from the wheel rim, and a recess 11 is formed in the top of said cap to prevent the threads in the upper end of the aperture 10 from being battered when the cap is struck with a hammer or like tool.

A valve of my improved construction is comparatively simple, can be easily and cheaply manufactured, is devoid of springs and like parts which are liable to get out of order easily, and as the gasket of the valve is maintained in close contact with the valve seat, and said seat is comparatively broad, liability of leakage of air through the valve is reduced to a minimum.

It will be readily understood that minor changes in the size, form and construction of the various parts of my improved valve may be made and substituted for those herein shown and described without departing from the spirit of my invention, the scope of which is set forth in the appended claim.

I claim:

In a valve of the class described, a tubular valve housing, a disk on the lower end thereof, the underface of which disk is flat, and the end of the opening into the tubular housing being counter-sunk, a valve rod in the opening through the valve housing, a disk fixed to the lower end of said valve rod, a lug projecting upwardly from the center of said disk, which lug receives the lower end of the valve rod, the upper end of said lug being conical and adapted to engage in the counter-sunk lower end of the opening through the valve housing, the top of the disk on the lower end of the valve rod being flat, and a gasket arranged on the flat face of said disk, the upper face of which gasket is flat and adapted to engage the flat lower face of the disk on the valve housing, and the lug on the disk carried by the valve rod being of such length as to permit the conical upper end of the lug to project above the top of the gasket when the parts are assembled.

In testimony whereof I hereunto affix my signature in the presence of two witnesses, this 30th day of November, 1912.

JOSEPH N. NEWSOM.

Witnesses:
SAML. CURTIS,
F. H. ALLEN.